United States Patent
Anderson et al.

(10) Patent No.: US 6,263,408 B1
(45) Date of Patent: Jul. 17, 2001

(54) METHOD AND APPARATUS FOR IMPLEMENTING AUTOMATIC CACHE VARIABLE UPDATE

(75) Inventors: Clark Alan Anderson; Lynn Charles Berning, both of Rochester; Louise Ann Marier, Byron, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/283,350

(22) Filed: Mar. 31, 1999

(51) Int. Cl.$^7$ .................................................. G06F 12/00
(52) U.S. Cl. ............................................................. 711/144
(58) Field of Search ..................................... 711/113, 144, 711/145, 3, 118, 141

(56) References Cited

U.S. PATENT DOCUMENTS

| | | | |
|---|---|---|---|
| 5,349,651 | * | 9/1994 | Hetherington et al. .............. 395/400 |
| 5,829,039 | * | 10/1998 | Sugino et al. ......................... 711/144 |
| 5,946,708 | * | 8/1999 | Fang et al. ............................. 711/113 |
| 5,974,508 | * | 10/1999 | Maheshwari ........................ 711/133 |
| 6,009,533 | * | 12/1999 | Zick ...................................... 713/501 |
| 6,128,717 | * | 10/2000 | Harrison et al. ..................... 711/202 |
| 6,141,728 | * | 10/2000 | Simionescu et al. ................ 711/113 |
| 6,145,055 | * | 11/2000 | Fujimoto ............................... 711/128 |

* cited by examiner

Primary Examiner—Kevin Verbrugge
(74) Attorney, Agent, or Firm—Joan Pennington

(57) ABSTRACT

A method and apparatus are provided for implementing automatic cache variable update. A cache variable update hardware maintains a plurality of variables indicative of a data segment in the cache. The plurality of variables include a segment state variable, a segment starting address variable, a segment length variable and a segment offset variable. The cache variable update hardware monitors the cache to identify a selection of a segment for a data transfer to and from the cache and to identify data transfers. The plurality of variables are initialized responsive to an identified cache search. The segment length variable is incremented responsive to a data block written to the cache. The segment state variable is modified responsive to a data transfer complete.

11 Claims, 7 Drawing Sheets

**CACHE VARIABLE UPDATE
HARDWARE VARIABLES 130**

| SEGMENT_STATE VARIABLE 132 |
| SEGMENT_START_LBA VARIABLE 134 |
| SEGMENT_LENGTH VARIABLE 136 |
| SEGMENT_OFFSET VARIABLE 138 |

FIG. 1B

METHOD AND APPARATUS FOR IMPLEMENTING AUTOMATIC CACHE VARIABLE UPDATE

FIELD OF THE INVENTION

The present invention relates generally to the data processing field, and more particularly, relates to a method and apparatus for implementing automatic cache variable update.

DESCRIPTION OF THE RELATED ART

Computer have become increasingly faster and one of the ways in which to increase the speed of computers is to minimize storage access time. In order to reduce data access time, special purpose high-speed memory spaces of static random access memory (RAM) called a cache are used to temporarily store data which are currently in use. For example, a processor cache typically is positioned near or integral with the processor. Data stored in the cache advantageously may be accessed by the processor in only one processor cycle retrieving the data necessary to continue processing; rather than having to stall and wait for the retrieval of data from a secondary memory, such as a higher level cache memory or a direct access storage device.

Storage devices often use a cache to speed access to stored data. The cache retains data transmitted to and from a requesting device or data that may be requested in the future. To retrieve data from the cache, the storage device must maintain variables that indicate what data is valid in the cache. These variables are typically maintained by software at the beginning or end of a transfer. Therefore, the variables do not match the segment contents during the transfer, a cause for data integrity exposures. The software must update the variable for each transfer completed to the requester, adding overhead to the code execution time which slows product performance.

SUMMARY OF THE INVENTION

A principal object of the present invention is to provide an improved method and apparatus for implementing automatic cache variable update. Other objects are to provide method and apparatus for implementing automatic cache variable update substantially without negative effects and that overcomes many of the disadvantages of prior art arrangements.

In brief, a method and apparatus are provided for implementing automatic cache variable update. A cache variable update hardware maintains a plurality of variables indicative of a data segment in the cache. The plurality of variables include a segment state variable, a segment starting address variable, a segment length variable and a segment offset variable. The cache variable update hardware monitors the cache to identify a selection of a segment for a data transfer to and from the cache and to identify data transfers. The plurality of variables are initialized responsive to an identified cache search. The segment length variable is incremented responsive to a data block written to the cache and the segment state variable is modified responsive to a data transfer complete.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a diagram illustrating cache variable update hardware variables maintained by a cache variable update hardware function of the preferred embodiment in the computer system of FIG. 1A.

DETAILED DESCRIPTION OF THE PREFERRED EMBODIMENTS

Figure 1A:
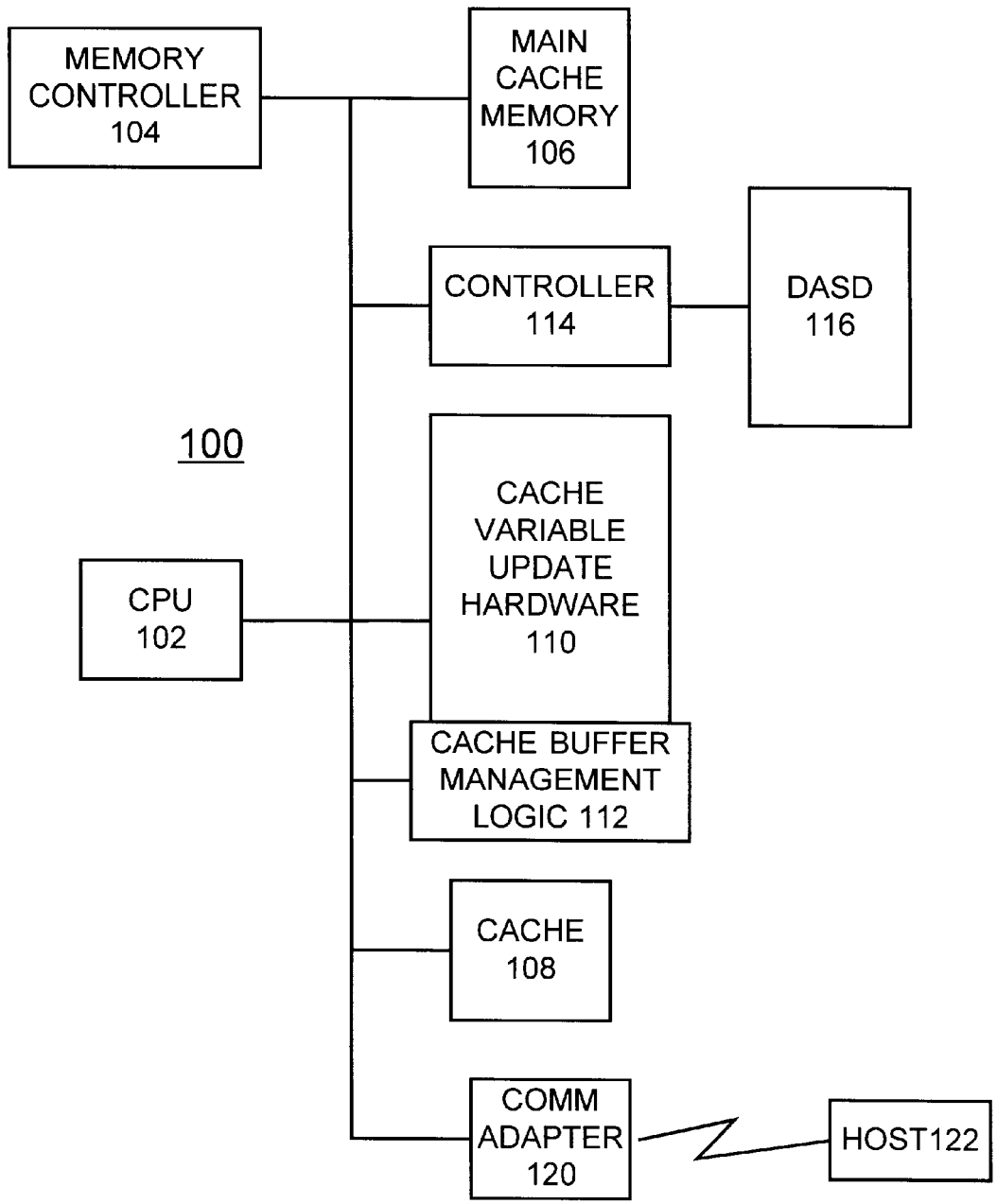
FIG. 1A is a block diagram representation of a computer system of the preferred embodiment.

Having reference now to the drawings, in FIG. 1A, there is shown a computer system generally designated by the reference character 100. Computer system 100 includes a central processor unit (CPU) 102, a memory controller 104, a first main cache memory 106 and a second cache 108 connected together via a system bus. Computer system 100 includes a cache variable update hardware 110 of the preferred embodiment used together with a cache buffer management logic 112 of the preferred embodiment. Computer system 100 includes a controller 114 coupled to a disk drive or direct access storage device (DASD) 116 and a communications adapter 120 coupled to a host computer 122. It should be understood that the present invention is not limited to use with the illustrated computer system 100 of FIG. 1. For example, one or multiple CPUs 102 and one or multiple memories 106, 108, 116 can be included within the computer system 100.

In accordance with features of the invention, cache variable update hardware 110 monitors the cache buffer management logic 112 for cache search or selection of a data segment for a transfer, host data transfers, and storage medium data transfer. Cache variable update hardware 110 can be implemented as an integral unit with memory controller 104 or DASD controller 114, for example, within a hard disk controller module. Cache variable update hardware 110 provides automatic cache variable update that advantageously is used to improve the performance of the disk drive 116.

In accordance with features of the invention, automatic cache variable update hardware 110 decreases command overhead in the software. Traditionally, the cache variables have been maintained by software, adding overhead to the beginning or end of the transfer. The overhead of cache variable update has typically been addressed by increasing processor performance to reduce overhead. Reducing software overhead with the cache variable update hardware 110 of the preferred embodiment allows more operations to be performed in an interval of time, increasing the performance of the storage device. Since the variables are updated on a real-time basis, the data integrity exposures are greatly reduced. Software is able to update the variables at the beginning or end of a transfer. As a result, with conventional software arrangements the cache search operation does not return an accurate representation of segments that are actively transferring data.

Referring to FIG. 1B, the cache variable update hardware block 110 maintains a plurality of cache variable update variables 130 to indicate the contents of each associated cache 106, 108. Cache variable update variables 130 include a Segment_State variable 132, a Segment_Start_LBA variable 134, a Segment_Length variable 136 and a Segment_Offset variable 138. In a multi-segmented cache 106, 108, a copy of the cache variable update variables 130 is maintained for each segment. The Segment_State variable 132 maintains flags indicating the type of activity currently being performed in the segment. These activities indicated by the Segment_State variable 132 include:

Segment Reading/Writing
Host Active
Disk Active
Host Pending
Disk Pending

The Segment_Start_LBA variable 134 indicates a first valid block of data in the segment. The Segment_Length variable 136 indicates a number of valid blocks in the segment. A Segment_Offset variable 138 indicates a pointer into physical memory of the Segment_Start_LBA variable 134.

The cache variable update hardware 110 updates the variables 132, 134, 136 and 138 at a cache search, a host data transfer, a drive data transfer, a host transfer complete, and a disk transfer complete. For cache search all variables are initialized for the segment, to prepare for data transfer to/from the cache. For a host data transfer, as each block of data is written into a cache buffer segment from the host, the Segment_Length 214 is incremented. If the Segment_Length 214 reaches its maximum value, then the Segment_Start_LBA 212 and Segment_Offset 216 are incremented. For a drive data transfer, as each block of data is written into a cache buffer segment from the storage medium, the Segment_Length 214 is incremented. If the Segment_Length 214 reaches its maximum value, then the Segment_Start_LBA 210 and the Segment_Offset 216 are incremented. For a host transfer complete, the segment state to host is set to idle. For a disk transfer complete, the segment state to disk is set to idle.

Figure 2:
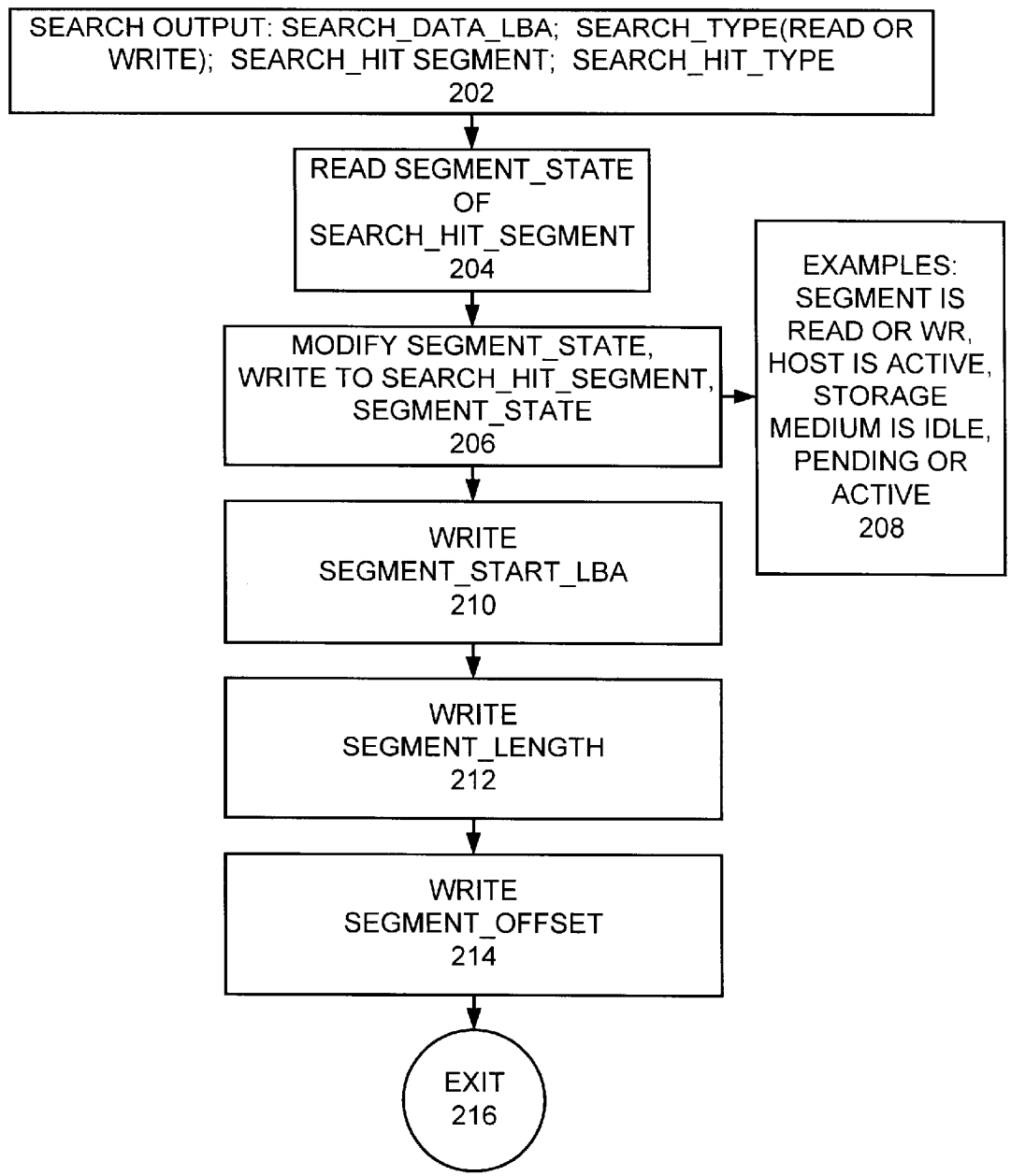
FIGS. 2–6 are logic flow diagrams illustrating the method and apparatus of the preferred embodiment.

Referring now to FIGS. 2–6, sequential operations for automatic cache variable update by the cache variable update hardware 110 are shown. In FIG. 2, sequential operations for cache variable update after cache search are shown. As indicated at a block 202, the cache search output includes a search data logical block address or Search_Data_LBA, a Search Type, (read or write), a Search_Hit_Segment, and a Search_Hit_Type. The Segment_State of Search_Hit_Segment is read as indicated at a block 204. Then the Segment_State variable 132 is modified and the Search_Hit_Segment and Segment_State are written as indicated at a block 206. Examples of the Segment_State are shown at block 208 including Segment is a read or write, host is active and storage medium is idle, pending or active. Next the Segment_Start_LBA variable 134 is written as indicated at a block 210. The Segment_Length variable 136 is written as indicated at a block 212. The Segment_Offset variable 138 is written as indicated at a block 214. This completes the cache variable update after cache search as indicated at a block 216.

Figure 3:
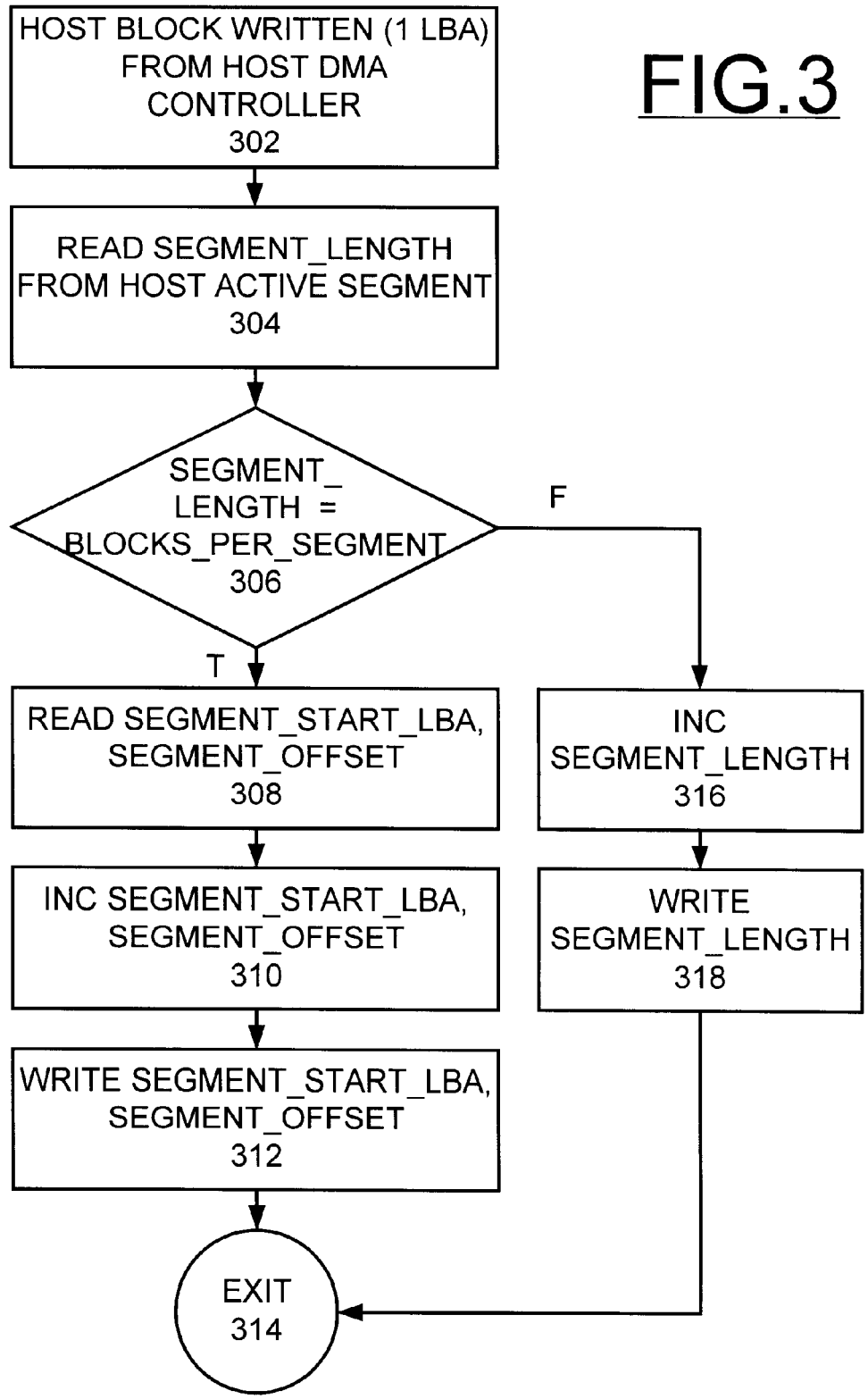

Referring now to FIG. 3, sequential cache variable update operations after a host data block is written to the cache buffer are shown. As indicated at a block 302, a host block is written from the host DMA controller. The Segment_Length from the host active segment is read as indicated at a block 304. The Segment_Length is compared with the Blocks_per_Segment as indicated at a decision block 306. When determined at decision block 306 that the Segment_Length is equal to the Blocks_per_Segment, then the Segment_Start_LBA and Segment_Offset are read as indicated at a block 308. The Segment_Start_LBA variable 134 and Segment_Offset variable 138 are incremented as indicated at a block 310. Then the Segment_Start_LBA variable 134 and Segment_Offset variable 138 are written as indicated at a block 312. This completes the cache variable update after host block is written to the cache buffer as indicated at a block 314. When determined at decision block 306 that the Segment_Length is not equal to the Blocks_per_Segment, then the Segment_Length is incremented as indicated at a block 316. Then the Segment_Length variable 136 is written as indicated at a block 318.

Figure 4:
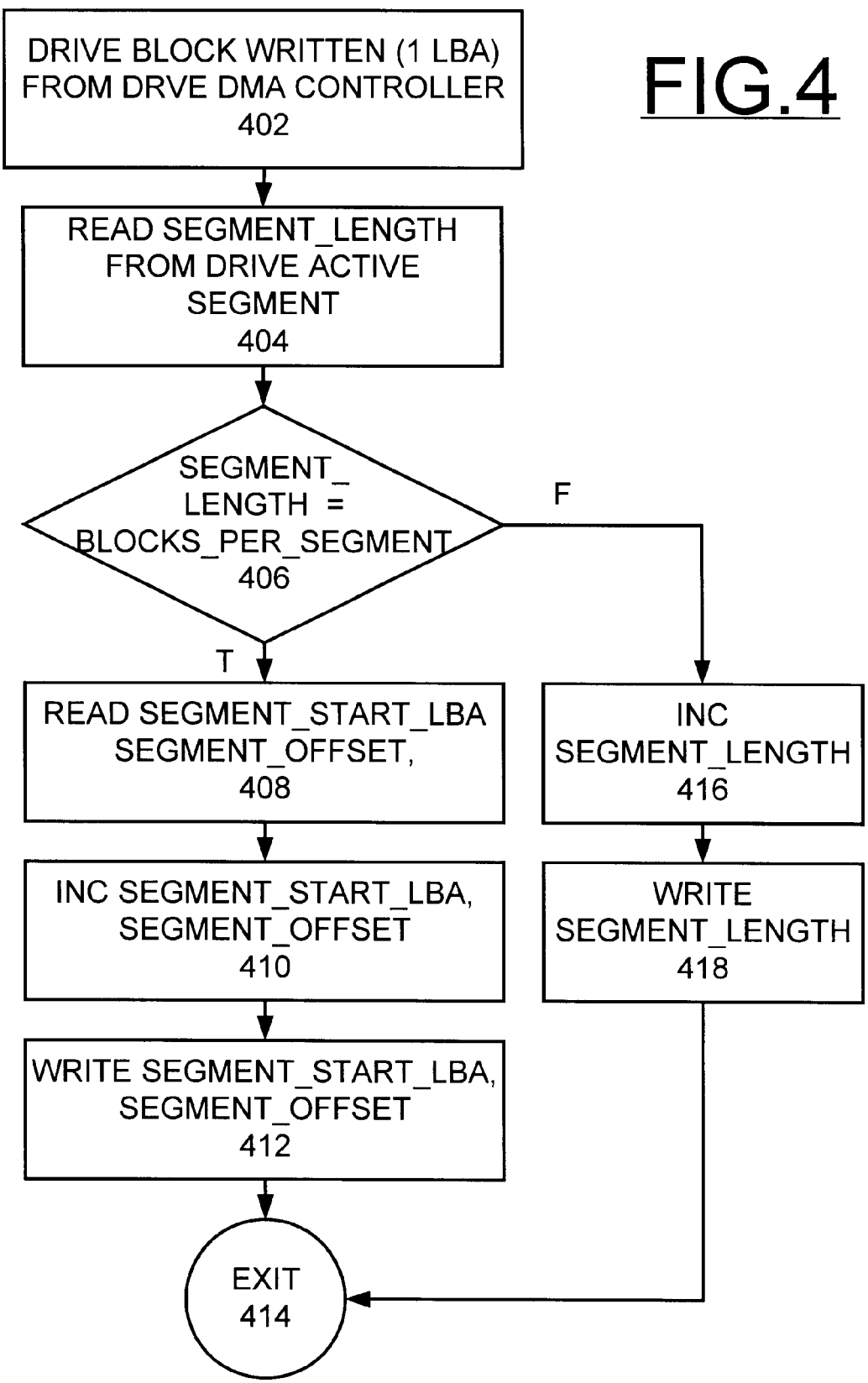

Referring now to FIG. 4, sequential cache variable update operations after a drive data block is written to the cache buffer are shown. As indicated at a block 402, a drive data block is written from the drive DMA controller. The Segment_Length from the drive active segment is read as indicated at a block 404. The Segment_Length is compared with the Blocks_per_Segment as indicated at a decision block 406. When determined at decision block 406 that the Segment_Length is equal to the Blocks_per_Segment, then the Segment Start_LBA and Segment_Offset are read as indicated at a block 408. The Segment_Start_LBA variable 134 and Segment_Offset variable 138 are incremented as indicated at a block 410. Then the Segment_Start_LBA variable 134 and Segment_Offset variable 138 are written as indicated at a block 412. This completes the cache variable update after the drive block is written to the cache buffer as indicated at a block 414. When determined at decision block 406 that the Segment_Length is not equal to the Blocks_per_Segment, then the Segment_Length is incremented as indicated at a block 416. Then the Segment_Length variable 136 is written as indicated at a block 418. This completes the cache variable update after the drive block is written to the cache buffer.

Figure 5:
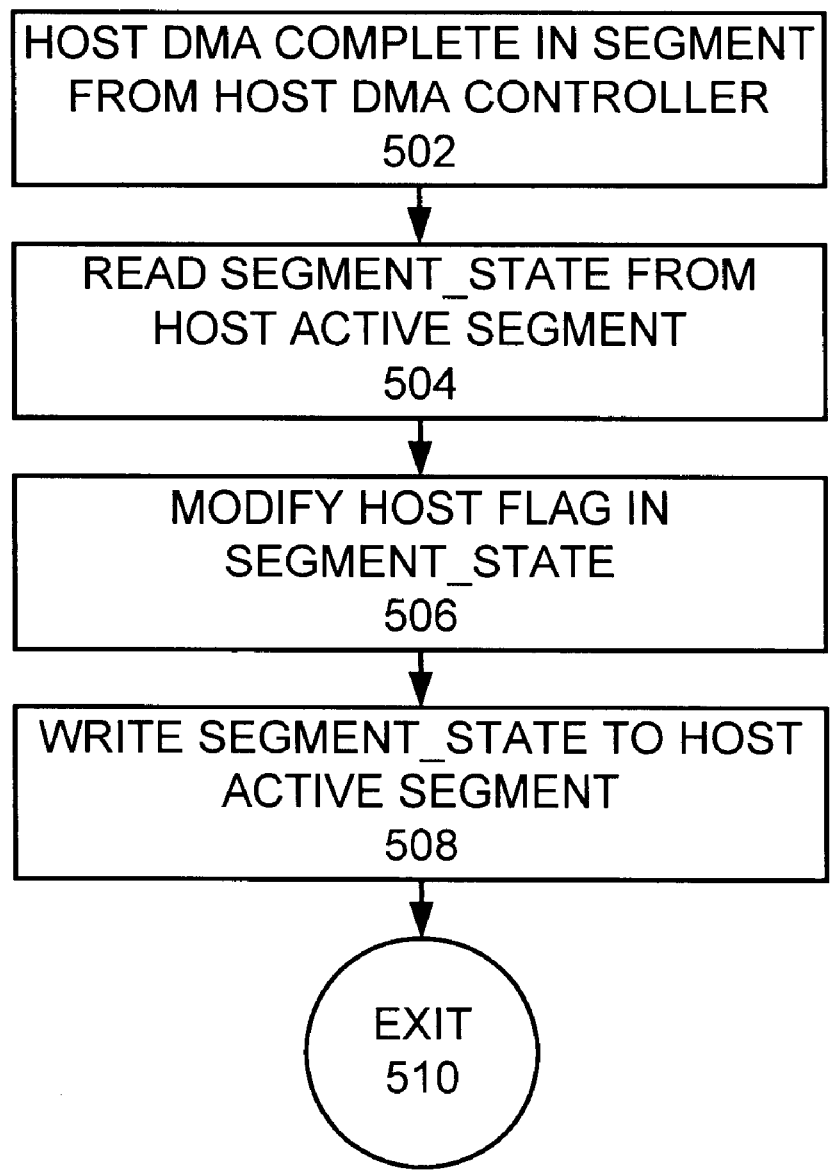

Referring now to FIG. 5, sequential cache variable update operations after a host transfer complete are shown. As indicated at a block 502, a host transfer complete in the segment is received from the host DMA controller. The Segment_State variable 132 is read from the host active segment as indicated at a block 504. The host flag in the Segment_State variable 132 is modified as indicated at a block 506. The Segment_State variable 132 is written to from the host active segment as indicated at a block 508. This completes the cache variable update after the host transfer complete as indicated at a block 510.

Figure 6:
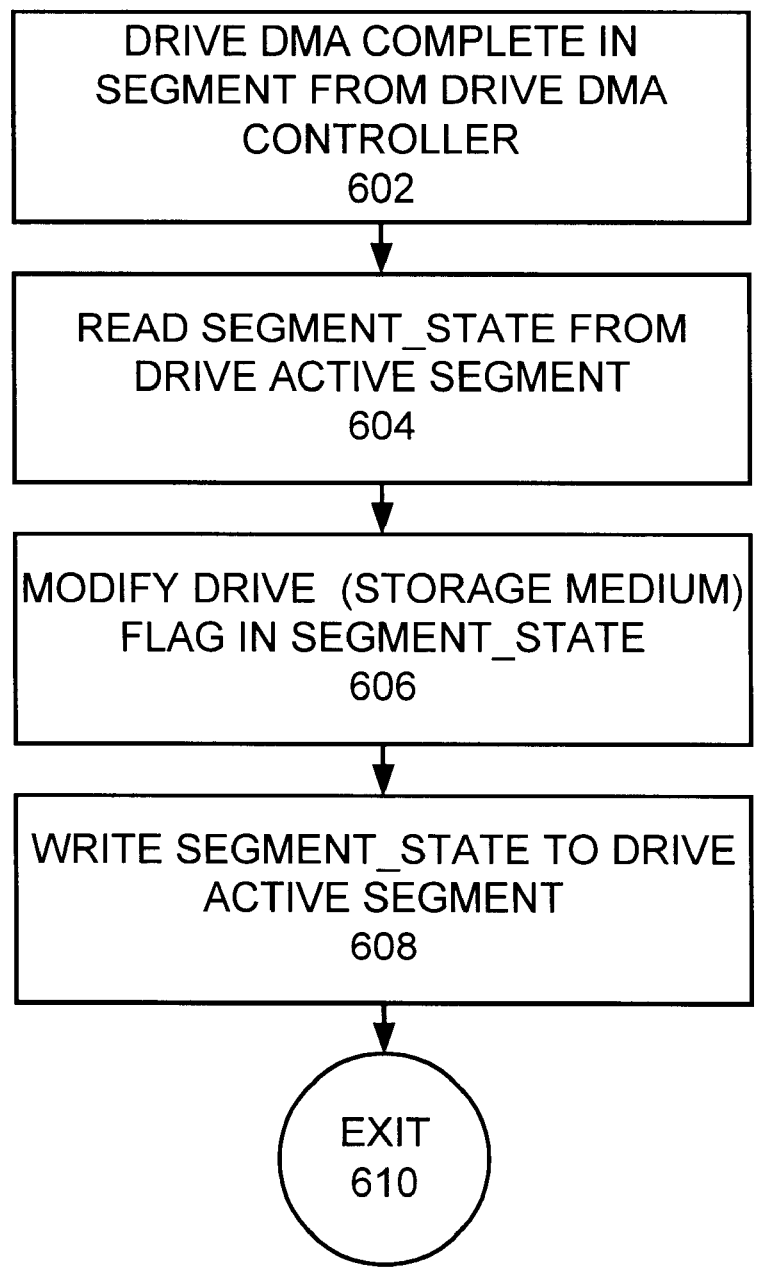

Referring now to FIG. 6, sequential cache variable update operations after a drive transfer complete are shown. As indicated at a block 602, a drive transfer complete in the segment is received from the drive DMA controller. The Segment_State variable 132 is read from the drive active segment as indicated at a block 604. The drive flag in the Segment_State variable 132 is modified as indicated at a block 606. The Segment_State variable 132 is written to from the drive active segment as indicated at a block 608. This completes the cache variable update after the drive transfer complete as indicated at a block 610.

While the present invention has been described with reference to the details of the embodiments of the invention shown in the drawing, these details are not intended to limit the scope of the invention as claimed in the appended claims.

What is claimed is:

1. Apparatus for implementing automatic cache variable update comprising:

a cache;

a cache variable update hardware coupled to said cache;

said cache variable update hardware maintaining a plurality of variables; said variables indicative of a data segment in said cache;

said plurality of variables including a segment state variable, a segment starting address variable, a segment length variable and a segment offset variable; and said cache variable update hardware maintaining a plurality of flags in said segment state variable, said flags indicating a type of activity being performed in said data segment in said cache.

2. Apparatus for implementing automatic cache variable update as recited in claim 1 wherein said cache variable update hardware maintains said flags indicating a read or a write being performed in said data segment in said cache and said flags indicating a host active and pending and a disk active and pending.

3. Apparatus for implementing automatic cache variable update as recited in claim 1 wherein said cache variable update hardware maintains said segment starting address variable to indicate a first valid block of data in said segment.

4. Apparatus for implementing automatic cache variable update as recited in claim 1 wherein said cache variable update hardware maintains said segment length variable to indicate a number of valid blocks of data in said segment.

5. Apparatus for implementing automatic cache variable update as recited in claim 1 wherein said cache variable update hardware maintains said segment offset variable as a pointer into a physical memory of said first valid block of data in said segment.

6. Apparatus for implementing automatic cache variable update as recited in claim 1 wherein said cache variable update hardware updates said plurality of variables with host and drive data transfers to said cache and after a cache search.

7. A method for implementing automatic cache variable update with a cache, said method performed by a cache variable update hardware comprising the steps of:

maintaining a plurality of variables indicative of a data segment in said cache; said plurality of variables including a segment state variable, a segment starting address variable, a segment length variable and a segment offset variable; and maintaining a plurality of flags in said segment state variable, said flags indicating a type of activity being performed in said data segment in said cache;

monitoring the cache to identify a selection of a segment for a data transfer to and from said cache and to identify data transfers;

initializing said plurality of variables responsive to an identified cache search;

incrementing said segment length variable responsive to a data block written to said cache; and modifying said segment state variable responsive to a data transfer complete.

8. The method for implementing automatic cache variable update as recited in claim 7 includes the steps of identifying a maximum value for said segment length variable and incrementing said segment starting address variable and said segment offset variable.

9. The method for implementing automatic cache variable update as recited in claim 8 wherein said segment starting address variable indicates a first valid block of data in a cache segment.

10. The method for implementing automatic cache variable update as recited in claim 7 wherein said step of maintaining said plurality of variables indicative of a data segment in said cache includes the steps of maintaining said flags of said segment state variable to indicate a segment read or a segment write operation being performed in said segment.

11. The method for implementing automatic cache variable update as recited in claim 10 includes the steps of maintaining said flags of said segment state variable to indicate an active or a pending operation being performed in said segment.

* * * * *